US012576339B2

(12) United States Patent
Dorn et al.

(10) Patent No.: US 12,576,339 B2
(45) Date of Patent: Mar. 17, 2026

(54) CUSTOM CHARACTER CREATION BASED ON BODY MOVEMENT AND USER INPUT DATA

(71) Applicant: Sony Interactive Entertainment Inc., Tokyo (JP)

(72) Inventors: Victoria Dorn, San Mateo, CA (US); Mahdi Azmandian, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 258 days.

(21) Appl. No.: 18/451,789

(22) Filed: Aug. 17, 2023

(65) Prior Publication Data

US 2025/0058228 A1 Feb. 20, 2025

(51) Int. Cl.
*A63F 13/67* (2014.01)
*A63F 13/213* (2014.01)
*A63F 13/215* (2014.01)

(52) U.S. Cl.
CPC ............ *A63F 13/67* (2014.09); *A63F 13/213* (2014.09); *A63F 13/215* (2014.09); *A63F 2300/5553* (2013.01)

(58) Field of Classification Search
CPC ...... A63F 13/67; A63F 13/213; A63F 13/215; A63F 2300/5553
See application file for complete search history.

(56) References Cited

U.S. PATENT DOCUMENTS

| | | | | | |
|---|---|---|---|---|---|
| 10,438,393 | B2 * | 10/2019 | Grant | .................... | G06T 13/40 |
| 2012/0295702 | A1 * | 11/2012 | Otero | .................... | A63F 13/69 |
| | | | | | 463/31 |
| 2014/0274392 | A1 * | 9/2014 | Beran | .................. | A63F 13/213 |
| | | | | | 463/36 |
| 2020/0312003 | A1 * | 10/2020 | Borovikov | ........... | A63F 13/213 |
| 2021/0275925 | A1 * | 9/2021 | Kolen | .................. | A63F 13/428 |
| 2023/0302357 | A1 * | 9/2023 | Doken | ................. | A63F 13/812 |

OTHER PUBLICATIONS

"Speech recognition", Available Online at: https://en.wikipedia.org/w/index.php?t itle=Speechrecognition&oldid=1166742156, Jul. 23, 2023, 28 pages.
"International Search Report and Written Opinion", issued by the European Patent Office, as International Searching Authority for PCT/US2024/041913 on Nov. 25, 2024, 11 pages.

* cited by examiner

*Primary Examiner* — David L Lewis
*Assistant Examiner* — Shauna-Kay Hall
(74) *Attorney, Agent, or Firm* — Kilpatrick Townsend & Stockton LLP

(57) ABSTRACT

A method for generating a character for use in a video game is provided, including: receiving captured video of a user; analyzing the captured video to identify movements of the user; using the identified movements of the user to define one or more animations of a character; receiving descriptive input generated by the user; determining game-specific constraints for the character in the video game; using the descriptive input and the game-specific constraints to prompt a generative artificial intelligence (AI) to generate visual elements of the character; using the character for gameplay of a video game, wherein using the character includes rendering the character having the generated visual elements and triggering the animations during the gameplay.

18 Claims, 6 Drawing Sheets

CUSTOM CHARACTER CREATION BASED ON BODY MOVEMENT AND USER INPUT DATA

BACKGROUND OF THE INVENTION

The video game industry has seen many changes over the years. As technology advances, video games continue to achieve greater immersion through sophisticated graphics, realistic sounds, engaging soundtracks, haptics, etc. Players are able to enjoy immersive gaming experiences in which they participate and engage in virtual environments, and new ways of interaction are sought. Furthermore, players may stream video of their gameplay for spectating by spectators, enabling others to share in the gameplay experience.

Some video games provide mechanisms for enabling a player to create or customize their avatar or character. However, these systems are often tedious and time-consuming to use, making it difficult to achieve a custom character that is to the player's liking.

It is in this context that implementations of the disclosure arise.

SUMMARY OF THE INVENTION

Implementations of the present disclosure include methods, systems and devices for custom character creation based on user body movement and user input data.

In some implementations, a computer-implemented method for generating a character for use in a video game is provided, including: receiving captured video of a user; analyzing the captured video to identify movements of the user; using the identified movements of the user to define one or more animations of a character; receiving descriptive input generated by the user; determining game-specific constraints for the character in the video game; using the descriptive input and the game-specific constraints to prompt a generative artificial intelligence (AI) to generate visual elements of the character; using the character for gameplay of a video game, wherein using the character includes rendering the character having the generated visual elements and triggering the animations during the gameplay.

In some implementations, receiving the descriptive input includes recording voice input of the user.

In some implementations, using the descriptive input includes translating the recorded voice input into descriptive text, and using the descriptive text to prompt the generative AI.

In some implementations, the descriptive input is defined by words describing a desired appearance of the character.

In some implementations, the animations are configured to mimic the identified movements of the user.

In some implementations, using the identified movements includes mapping the movements to a skeletal rig of the character.

In some implementations, using the identified movements includes adjusting settings of one or more predefined animations for the character based on the identified movements.

In some implementations, the method further includes presenting an interface on a display, said interface configured to instruct the user to perform the movements.

In some implementations, triggering the animations is responsive to receiving gameplay input generated from an input device.

In some implementations, the visual elements include one or more of a texture, facial appearance, body structure, or clothing.

In some implementations, the game-specific constraints include one or more of an art style, a character type, or a character function.

In some implementations, the character defines an avatar of the user for the gameplay of the video game.

In some implementations, a non-transitory computer-readable medium is provided having program instructions embodied thereon that, when executed by at least one computing device, cause said at least one computing device to implement a method for generating a character for use in a video game, said method including: receiving captured video of a user; analyzing the captured video to identify movements of the user; using the identified movements of the user to define one or more animations of a character; receiving descriptive input generated by the user; determining game-specific constraints for the character in the video game; using the descriptive input and the game-specific constraints to prompt a generative artificial intelligence (AI) to generate visual elements of the character; using the character for gameplay of a video game, wherein using the character includes rendering the character having the generated visual elements and triggering the animations during the gameplay.

Other aspects and advantages of the disclosure will become apparent from the following detailed description, taken in conjunction with the accompanying drawings, illustrating by way of example the principles of the disclosure.

BRIEF DESCRIPTION OF DRAWINGS

The disclosure may be better understood by reference to the following description taken in conjunction with the accompanying drawings in which.

DETAILED DESCRIPTION OF THE INVENTION

Broadly speaking, implementations of the present disclosure provide systems and methods for custom character creation based on user body movement and user input data.

Implementations of the disclosure allow for the generation of custom characters for specific games based on input data that describes the type of character, skills, and style desired. An AI system receives this input data and outputs the first pass of a custom character, which the user can then modify. The system can generate a character for Game A, and then re-generate the character for Games B, C, and D, with each character specialized for the unique environment of each game. For example, if the player needs to jump frequently in Game B, the character generated for that game will have a physique that is able to jump and perform well in that game environment. In some implementations, descriptive language is used to set constraints, and a custom character is generated for a specific game environment. This can greatly enhance the user's gaming experience by providing a character that is tailored to the specific game being played.

Figure 1:
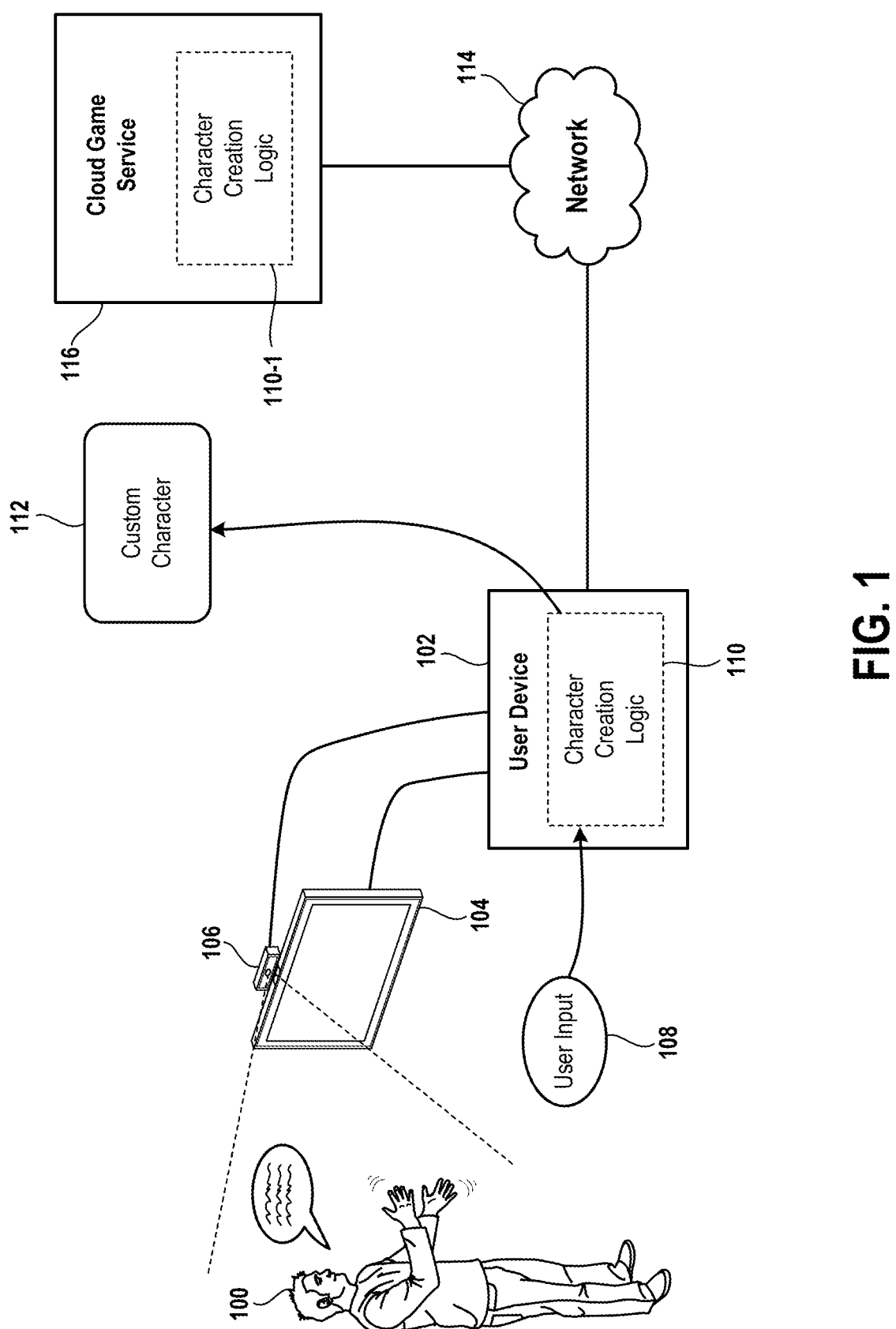
FIG. 1 conceptually illustrates a process and system for creating a custom character for a video game, in accordance with implementations of the disclosure.

FIG. 1 conceptually illustrates a process and system for creating a custom character for a video game, in accordance with implementations of the disclosure.

Users of video games greatly enjoy customizing their avatars or characters, as this provides a personalized experience and affords individual creative expression in the context of video games. However, existing systems and processes for custom character creation are tedious and time-consuming to use. Often the user is required to navigate extensive menus of options and individually define their custom preferences for a large number of character parts, resulting in a high-friction process. However, in contrast to these existing systems, implementations of the present disclosure provide a low-friction process for custom character creation, leveraging inputs that are natural for the user and employing techniques to efficiently generate character attributes that are in-line with the user's desired character appearance.

In the process illustrated at FIG. 1 a user 100 engages in a custom character creation process by providing user input 108 for processing by a character creation logic 110. The character creation logic 110 is configured to generate a custom character 112 based on the user input 108. In some implementations, the character creation logic 110 is executed by a user device 102, which in some implementations, may also be a device that executes the video game in which the custom character 112 will be used. By way of example without limitation, the user device 102 may be a game console, personal computer, laptop, tablet, cellular phone, mobile device, portable gaming device, set-top box, streaming device, smartTV, or other computing device capable of executing the functionality of the character creation logic 110 as described herein. In some implementations, the character creation logic is at least partially remotely executed by a cloud resource and accessed over a network 114 by the user device 102, e.g. as shown in the illustrated implementation, implemented in the form of character creation logic 110-1 as part of a cloud game service 116. In some implementations, the cloud game service 116 is part of a gaming platform on which the video game is implemented.

In some implementations, the character creation logic 110 is configured to render an interface presented on a display 104 (e.g. television, monitor, LCD/LED display, head-mounted display (HMD), projector, etc.). The interface is configured to guide the user 100 through the custom character creation process, such as by prompting the user to provide specific kinds of input. For example, in some implementations, the interface prompts the user to make certain gestures or movements that are used in the video game. Examples of such gestures might include throwing an object (e.g. for a sports video game), or swinging an object (e.g. swinging a sword for an adventure game), or other types of movements which may be used in a video game, such as walking, running, jumping, skipping, punching, kicking, drawing a bow, pulling a trigger, turning a wheel, etc. Video of the user 100 performing such movements can be captured by a camera 106, and analyzed by the character creation logic 110.

For example, the video can be analyzed to recognize or identify the movements of the user, and these movements can be mapped to, or used to define, animations of the custom character 112. In some implementations, this is performed so that the animations are configured to render the custom character 112 performing such movements in the style of the user or in a manner that mimics the motion of the user 100. In this manner, the character's movements as embodied by the animations, can take on a likeness or similarity to the user that is individually defined and particular to the specific user 100. In some implementations, animations of the custom character 112 are defined from the user's movements, in part by mapping the user's movements to a skeletal rig of the custom character 112.

In addition to capturing the movements of the user 100 through recorded video, the physical appearance of the user 100 is also captured in the recorded video or in recorded images of the user by the camera 106. In some implementations, the recorded video/images of the user are analyzed by the character creation logic 110 to identify aspects of the user's appearance, such as their body structure, facial appearance, hairstyle, clothing pieces (e.g. shirt, pants, skirt, dress, footwear, belt, hat, jacket, etc.), clothing style, colors (e.g. skin, eye, hair, clothing, etc.), etc. In some implementations, these aspects are used by the character creation logic 110 to generate the custom character 112 so as to have similar visual features to those of the user.

In addition, the user input 108 can further include descriptive input generated by the user 100. For example, in some implementations, the user 100 is prompted by the interface to speak a description of how they wish their custom character to appear. The user's speech can be recorded as audio (e.g. using a microphone, which can be integrated with the camera 106 in some implementations). The recorded audio of the user's speech is analyzed to determine its descriptive content, such as by using a speech recognition process, and the descriptive content is then used to generate the custom character 112 so as to possess characteristics in accordance with the user's wishes.

In some implementations, the custom character 112 can be further edited by the user 110. For example, the interface can provide access to editing tools enabling the user to make further adjustments to the custom character 112. In some implementations, the custom character 112 can be iterated upon by accepting additional input from the user and performing similar processing as that described above, but also using the existing generated custom character as an input for the character creation logic 110 to generate a second version of the custom character.

It will be appreciated that the custom character 112 can be used as an avatar of the user in the video game. In this way, the user's avatar can be uniquely defined for the user, and custom created in an efficient manner with characteristics in accordance with the user's wishes and movements similar to those of the user.

In some implementations, the custom character 112 is used to generate a custom character for a different video game, enabling a custom character suitable for another video game to be easily created, but also having characteristics of the original custom character. In this manner, an existing custom character can be leveraged across multiple video games.

Figure 2:
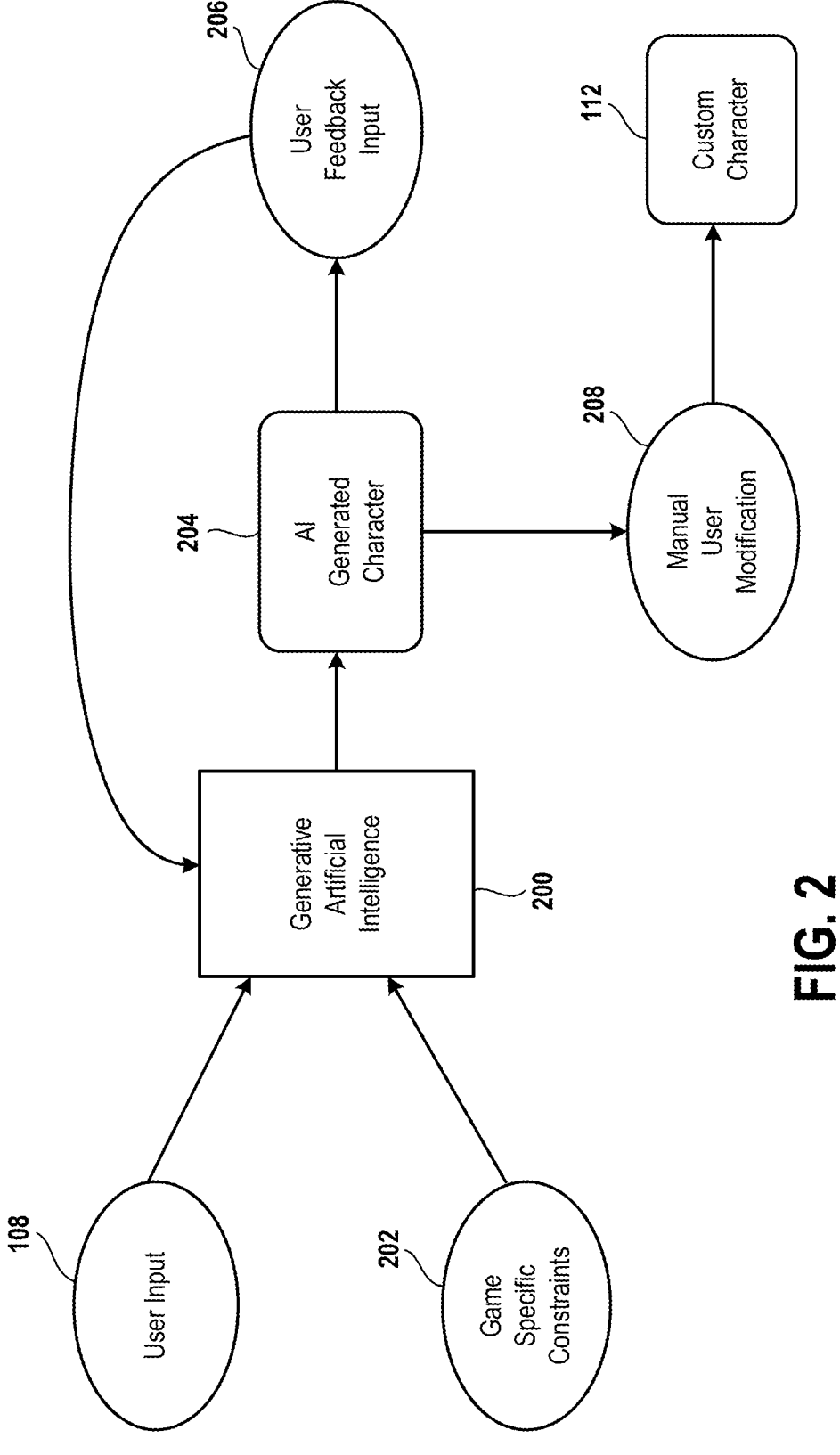
FIG. 2 conceptually illustrates a system for custom character creation . . . .

FIG. 2 conceptually illustrates use of a generative artificial intelligence (AI) for creation of a custom character, in accordance with implementations of the disclosure.

In some implementations, the illustrated process is implemented by the character creation logic 110. Generally speaking, a generative AI 200 is employed to generate the custom character 112. In some implementations, the generative AI 200 is configured to use the user input 108, as well as game-specific constraints 202, to generate the custom character 112.

In some implementations, a prompt is generated for the generative AI 200 using the user input 108 and the game-specific constraints 202. For example, the user input 108 may include voice input in the form of recorded audio of the user's speech as described above, and the recorded audio can be analyzed using a speech recognition process to determine the contents of the user's speech. The speech recognition process can be configured to determine the word content of the user's speech, and may further determine the semantic meaning of the user's speech. These can be used to formulate a text prompt for the generative AI 200. Such a text prompt may include words from the determined word content of the user's speech, as well as words embodying the semantic meaning of the user's speech. It will be appreciated that by using the semantic meaning of the user's speech to define the prompt, nuanced aspects of the user's speech such as points of emphasis or deemphasis, ordering or prioritization of concepts, figures of speech, non-literal intent, slang, etc. can be interpreted and handled so as to accurately capture the intent of the user's speech as it relates to character customization.

In some implementations, imagery of the user is analyzed and used to generate the prompt for the generative AI 200. For example, as has been noted, captured images or video of the user 100 can be analyzed to identify features of the user's appearance, such as their facial/body appearance, clothing, etc. In some implementations, these are analyzed using a recognition model configured to identify such features and generate a text description of such features, which can include details such as styles and colors. In some implementations, such a recognition model is configured to identify not only particular features of the user's appearance, but also identify a fashion style or visual style of the user's appearance (e.g. casual, preppy, chic, bohemian, vintage, grunge, punk, street, etc.). The text description of the user's appearance can be used to generate the prompt for the generative AI 200, so that the generative AI 200 will generate a custom character having features similar to those of the user.

In some implementations, the generative AI 200 is itself configured to directly use an image/video of the user to generate the custom character. That is, the generative AI 200 may use an image/video of the user as input and generate the custom character to have features similar/related to, or based on, the appearance features of the user as depicted in the image/video.

In some implementations, a user appearance setting can be provided to enable the user to control how much of, or the extent to which, their appearance is incorporated into the custom character. For example, in some implementations, a slider bar, dial, percentage control, selectable presets (e.g. none, low, medium, high, etc.) or other interface elements can be presented through the character creation user interface to enable the user to set an extent to which their appearance will influence the appearance of the custom character generated by the generative AI 200. In some implementations, this can range from zero/none, wherein the user's appearance is not used at all, to a maximum amount, wherein the generative AI 200 attempts to generate the custom character in a manner that maximally resembles the user's appearance (subject to game-specific constraints as described elsewhere herein).

It will be appreciated that based on the user appearance setting as presently described, the prompt for the generative AI 200 will be constructed so as to emphasize, utilize, or incorporate, more or less of the user's appearance features in accordance with the extent to which the user wishes their custom character to resemble their appearance. In this manner, the user can more easily design a custom character resembling their appearance, and control the extent of that resemblance.

In some implementations, game-specific constraints 202 are utilized by the generative AI 200 for the generation of the custom character. Broadly speaking, the game-specific constraints define requirements to ensure that the custom character is suitable for the intended video game in which the custom character is to be used. For example, in some implementations, the game-specific constraints 202 can define an art style or genre or elements thereof, to ensure that the custom character will fit within the art style of the video game, and have the appropriate look and feel for the video game's virtual environment or context. In some implementations, the game-specific constraints 202 can define a character type that is specific to the video game, including defining required features or elements of the character type. For example, if the character is specified to be a pilot for the video game, then the character may be required to have a helmet or appropriate pilot suit for the video game. In another example, the video game may have several classes/types/genres of characters, each with distinctive traits, and accordingly, the game-specific constraints 202 may specify the type and traits that are required. For example, in a fantasy video game, there might be character classes such as warrior, elf, dwarf, magician, dragon, etc., and the game-specific constraints 202 may identify the class of character to be generated as well as required elements or features for the particular class of character.

In some implementations, the game-specific constraints 202 may define one or more functions that the character should be able to perform. For example, the game-specific constraints 202 may specify that the character needs to jump frequently in the game, and accordingly, the character generated for that game will have a physique that is able to jump and perform well in the game environment. Or as another example, the character may be required to hold or operate certain objects such as weapons, and thus the game-specific constraints 202 may specify this capability so that the generated character will be generated with appropriate limbs or hands capable of performing these functions.

In some implementations, the generative AI 200 is trained on the target video game's characters and environment, so as to learn the art style(s) used in the game, and the features and characteristics of characters or types of characters used in the game. In this manner, the generative AI 200 can be configured to generate custom characters which are in accordance with the game's existing assets. In some implementations, the generative AI 200 is trained on an asset library of the particular video game.

In some implementations, the generative AI 200 directly generates the custom character 112. However, in other implementations, the character generated by the generative AI 200 is further modified before arriving at the final custom character 112. For example, in some implementations, the AI driven process is configured to iterate upon the custom character based on user feedback. For example, the generative AI 200 may generate an initial AI generated character 204, and the user may respond by providing user feedback input 206, which, along with the AI generated character 204 is fed back to the generative AI 200 to iterate upon. For example, the user may provide feedback input 206 in the form of additional voice input or text input describing changes that the user would like to see made to the character. It will be appreciated that this process can be repeated in an iterative fashion so that the user can make adjustments to the custom generated character that are effected by the generative AI 200. Furthermore, the user feedback input 206 can be used to refine the generative AI 200 so that it improves over time in its ability to generate characters having the desired characteristics as instructed by users of the system.

In some implementations, the initial AI generated character 204 can be further modified using a manual user modification process 208. For example, an interface for manually editing the AI generated character 204 can be presented, enabling the user to make specific adjustments to the AI generated character 204 until they are satisfied, with the final output being the custom character 112.

In some implementations, the generative AI 200 is configured to generate a custom character by generating or adjusting aspects of a three-dimensional (3D) character model. By way of example without limitation, this can include generating or adjusting the topology (e.g. polygon mesh), textures, skeletal rig, skinning, or other aspects of a 3D character model. In some implementations, the generative AI 200 uses an existing 3D character model, and adjusts or otherwise determines settings affecting the appearance of the 3D character model. In this manner, the generative AI 200 is configured to generate the custom character having certain features or attributes that determine the appearance of the custom character, such as the body/limb/facial structure, skin, hair, clothing, etc.

Figure 3:
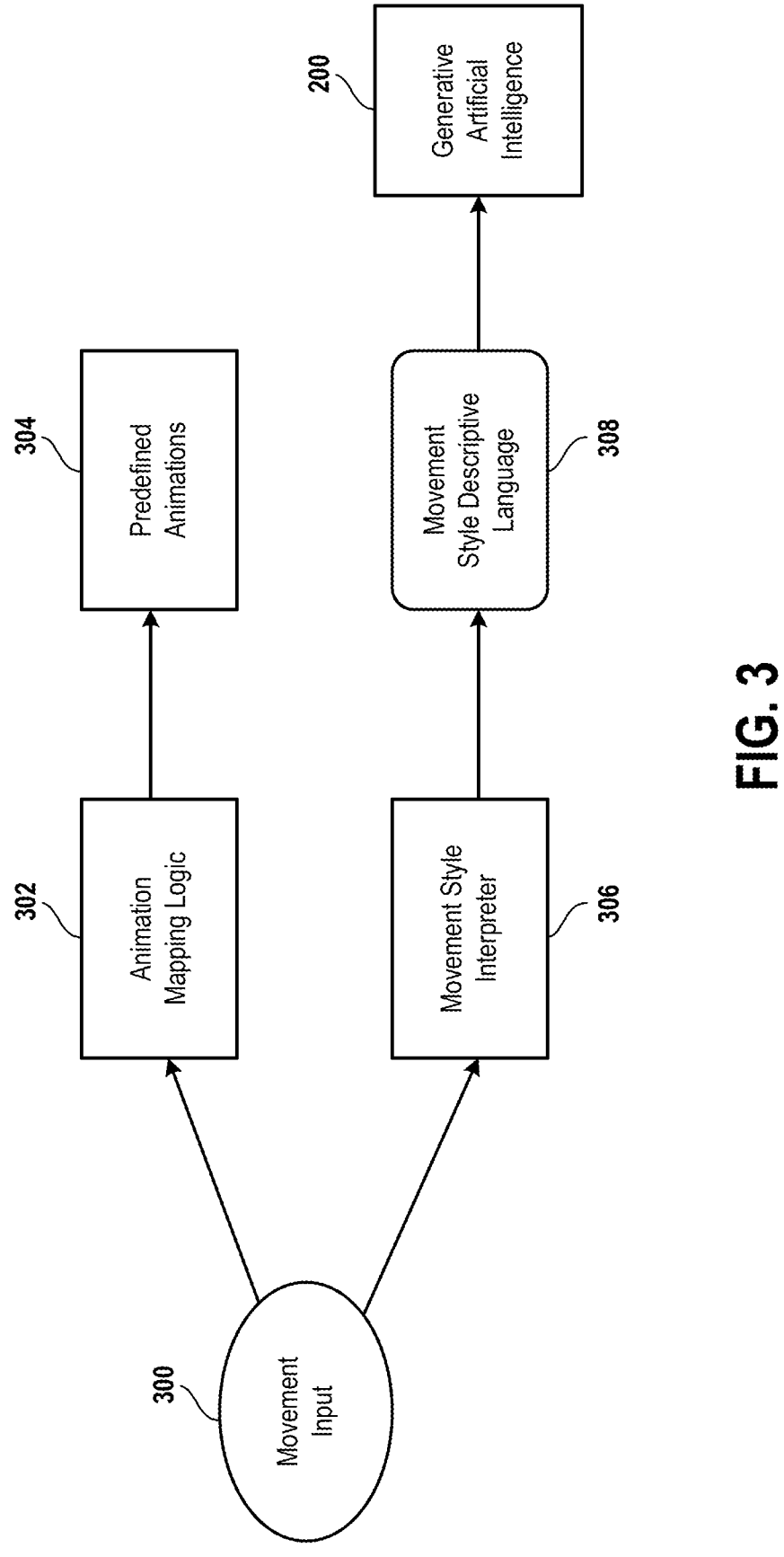
FIG. 3 conceptually illustrates use of movement input to generate or define animations for a custom character for a video game, in accordance with implementations of the disclosure.

FIG. 3 conceptually illustrates use of movement input to generate or define animations for a custom character for a video game, in accordance with implementations of the disclosure.

In some implementations, the illustrated process can be implemented by the character creation logic 110. In some implementations, movement input 300 which captures the movements of the user can be used to define animations of the custom character. As has been described, movement input 300 can include recorded image/video of the user performing movements. In other implementations, the movement input 300 can include other forms of input data capable of capturing the user's movements, such as data from motion sensing hardware, motion controllers, sensors worn by the user, an HMD, or any other device capable of tracking the user's movements.

In some implementations, animation mapping logic 302 is configured to use the movement input 300 to define animations for the custom character, which are stored as predefined animations 304. For example, the animation mapping logic 302 may identify the movements of the user from the movement input 300, and map the movements to the custom character, so that animations of the custom character performing movements mimicking, or similar to, the user's movements are created. In some implementations, the animation mapping logic 302 is configured to map the user's movements to a skeletal rig of the custom character, thereby enabling the custom character to have predefined animations

304 based on the user's movements. In some implementations, this can entail identifying and tracking anatomical aspects of the user, and mapping these to the skeletal rig of the custom character.

In some implementations, the user's movements are mapped onto an existing animation template of the custom character, so that adjustments are made to the animation template based on the user's movements so as to create a predefined animation that is more similar to the user's movements. As has been discussed above, this can be part of a process whereby the user is instructed through an interface to perform a specific action (e.g. throwing a ball), and a corresponding animation template can be tailored based on the user's motion so that a predefined animation is created to enable the custom character to mimic the user's motion when performing the specific action. In some implementations, the animation template may have a variety of settings that are adjustable within predefined ranges, and accordingly, these settings are adjusted or set based on the user's movements.

It will be appreciated that the predefined animations 304 can be triggered during gameplay by the user, and accordingly, the custom character will be responsively rendered performing the predefined animations. For example, one of the predefined animations may define how the custom character jumps, and by pressing a button on a controller, the jumping animation is triggered during gameplay by the user. In this manner, custom animations can be easily created and implemented in a video game, providing an added dimension of personalization to the custom character.

In some implementations, a movement style interpreter 306 is implemented to determine input for the generative AI 200 based on the movement input 300. For example, the movement style interpreter 306 may evaluate the movement input 300 and generate movement style descriptive language 308 consisting of words that describe or are otherwise determined from the user's movements. For example, words such as fast, slow, flexible, graceful, powerful, energetic, fluid, rigid, gymnastic, dance, etc. might be generated based on an evaluation of the user's movement style. And such words can be provided as input to the generative AI 200 for generating the custom character. In this manner, the custom character can be generated having visual traits that are suggestive of the user's movement style.

Figure 4:
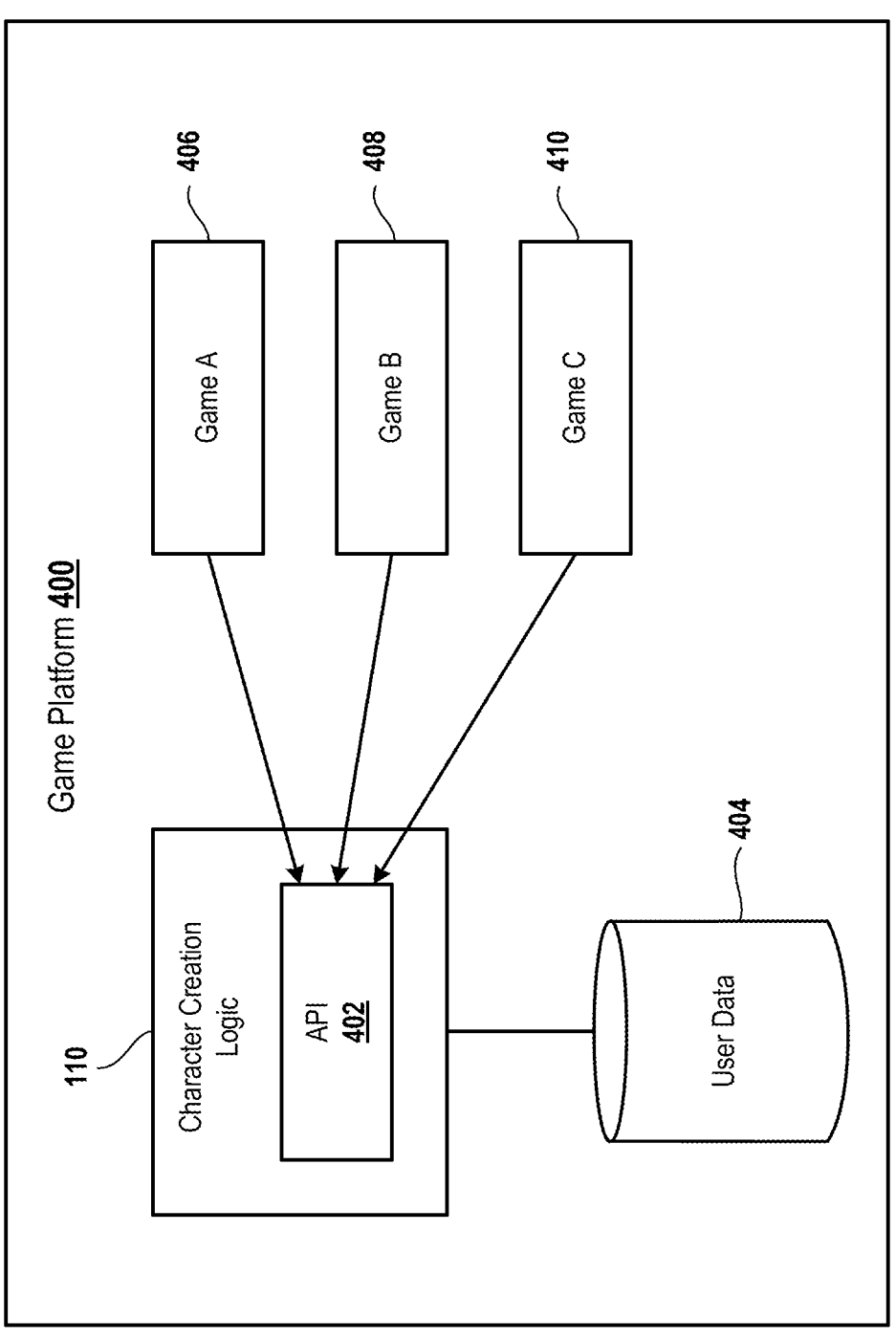
FIG. 4 conceptually illustrates a system for providing custom character creation across multiple video games on a game platform, in accordance with implementations of the disclosure.

FIG. 4 conceptually illustrates a system for providing custom character creation across multiple video games on a game platform, in accordance with implementations of the disclosure.

In the illustrated implementation, the character creation logic 110 is implemented on a game platform 400. Broadly speaking, the game platform 400 defines the execution environment on which video games, such as video games 406, 408, and 410, are developed and run. Examples of such game platforms include game console related platforms, computer operating systems, mobile device application environments, hybrid local and cloud environments, etc. By implementing the character creation logic 110 at the game platform level, it can be made available for use by multiple games on the platform.

In some implementations, the character creation logic 110 exposes an API 402 that is accessible by the video games 406, 408, and 410, to enable custom character creation that is specific to each video game. For example, a given video game may access the functionality of the character creation logic 110 via the API 402, may provide game-specific constraints to enable the custom character creation process, or access custom characters that are stored in association with the user's account on the game platform as part of user data 404.

Figure 5:
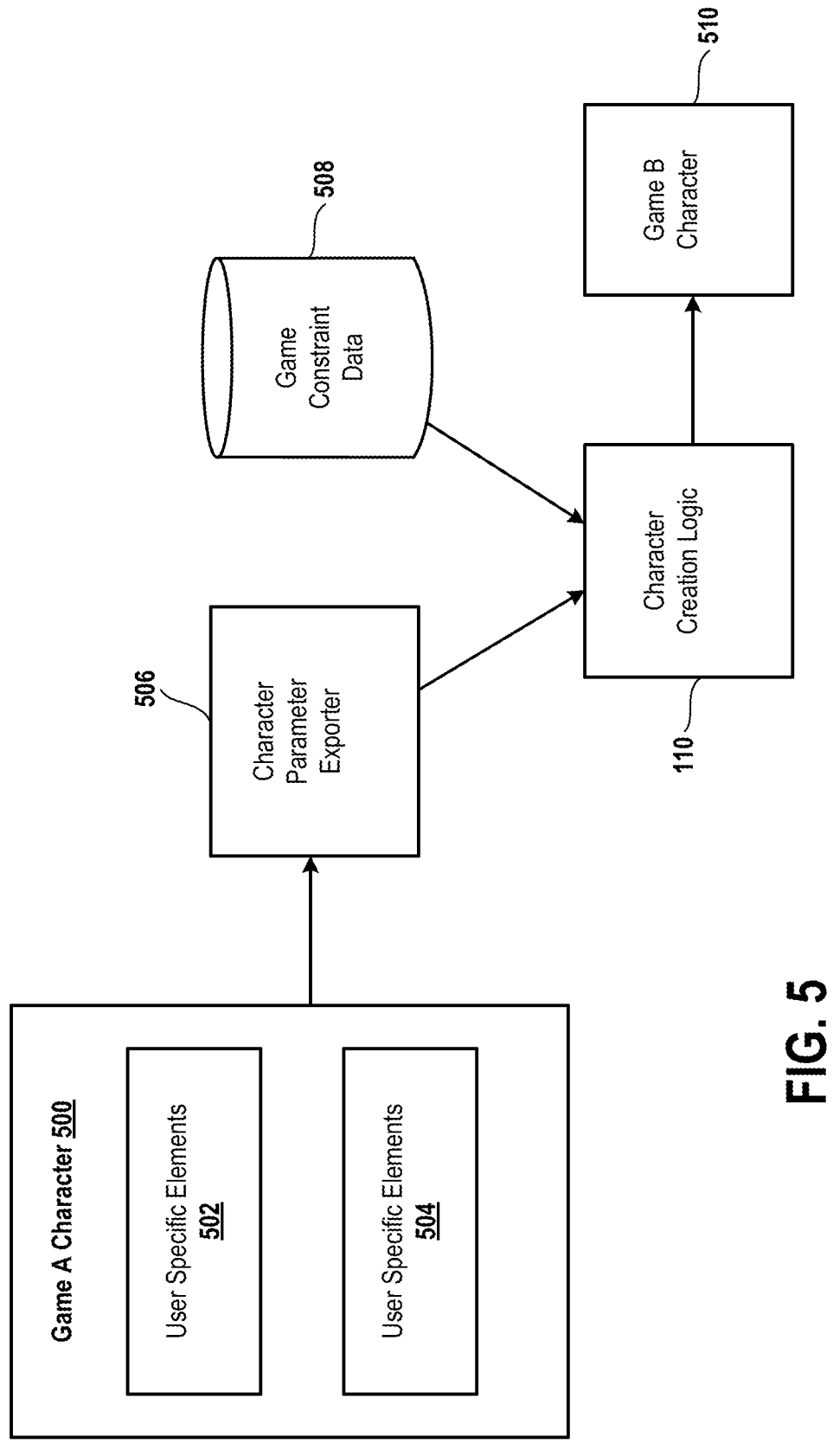
FIG. 5 conceptually illustrates a process for exporting a custom character from one video game to another video game, in accordance with implementations of the disclosure.

FIG. 5 conceptually illustrates a process for exporting a custom character from one video game to another video game, in accordance with implementations of the disclosure.

In the illustrated implementation, a custom character 500 has been created for a first video game "Game A." in accordance with implementations of the disclosure as have been discussed herein. It will be appreciated that the character 500 is thus the result of a process incorporating user input of various kinds, and possibly further refinements to arrive at a character suitable for Game A. After creating the custom character 500, the user may wish to export character 500 for use with another video game "Game B." However, the character 500 is tailored for Game A, for example, in terms of art style, features, form, functionality, etc., and these may not all be suitable or fitting for Game B.

Therefore, in some implementations, a character parameter exporter 506 is implemented to export parameters of character 500 which can be used to generate a custom character suitable for Game B. Broadly speaking, the character parameter exporter 506 is configured to export parameters and elements of the custom character 500 which can be transferred over to, or otherwise incorporated into a custom character for Game B.

In some implementations, the character parameter exporter 506 is configured to export user specific elements 502 of the custom character 500, while not exporting game specific elements 504 of the custom character 500. The user specific elements 502 include elements that have been defined based on user input and other user initiated adjustments, and which are not specific to Game A. For example, user specific elements 502 can include parameters that define how the character 500 is configured to mimic aspects of the user, such as their body and facial appearance, clothing/dress style, etc., and may include specific features or traits requested by the user, such as defined through user provided descriptive input or modifications.

In other implementations, the character parameter exporter 506 is configured to export certain ones of the game specific elements 504 which are capable of being transferred to, or otherwise incorporated into, a custom character for Game B. In this way aspects of the custom character 500 that are for Game A, may nonetheless be incorporated into a character for Game B, enabling the user to create a character for Game B that more closely resembles the original character 500 for Game A.

In some implementations, the elements and parameters exported by the character parameter exporter 506 are provided to the character creation logic 110, along with game constraints from a game constraint data storage 508. The character creation logic 110 uses these pieces of information to generate a custom character 510 that is suitable for Game B, yet possesses characteristics that were embodied in character 500.

In some implementations, an adjustable setting is provided to enable the user to adjust how much of the user specific elements 502 to incorporate into the character 510. By adjusting such a setting, the user may tune up or down the extent to which aspects defined from themself are incorporated in the custom character 510.

Figure 6:
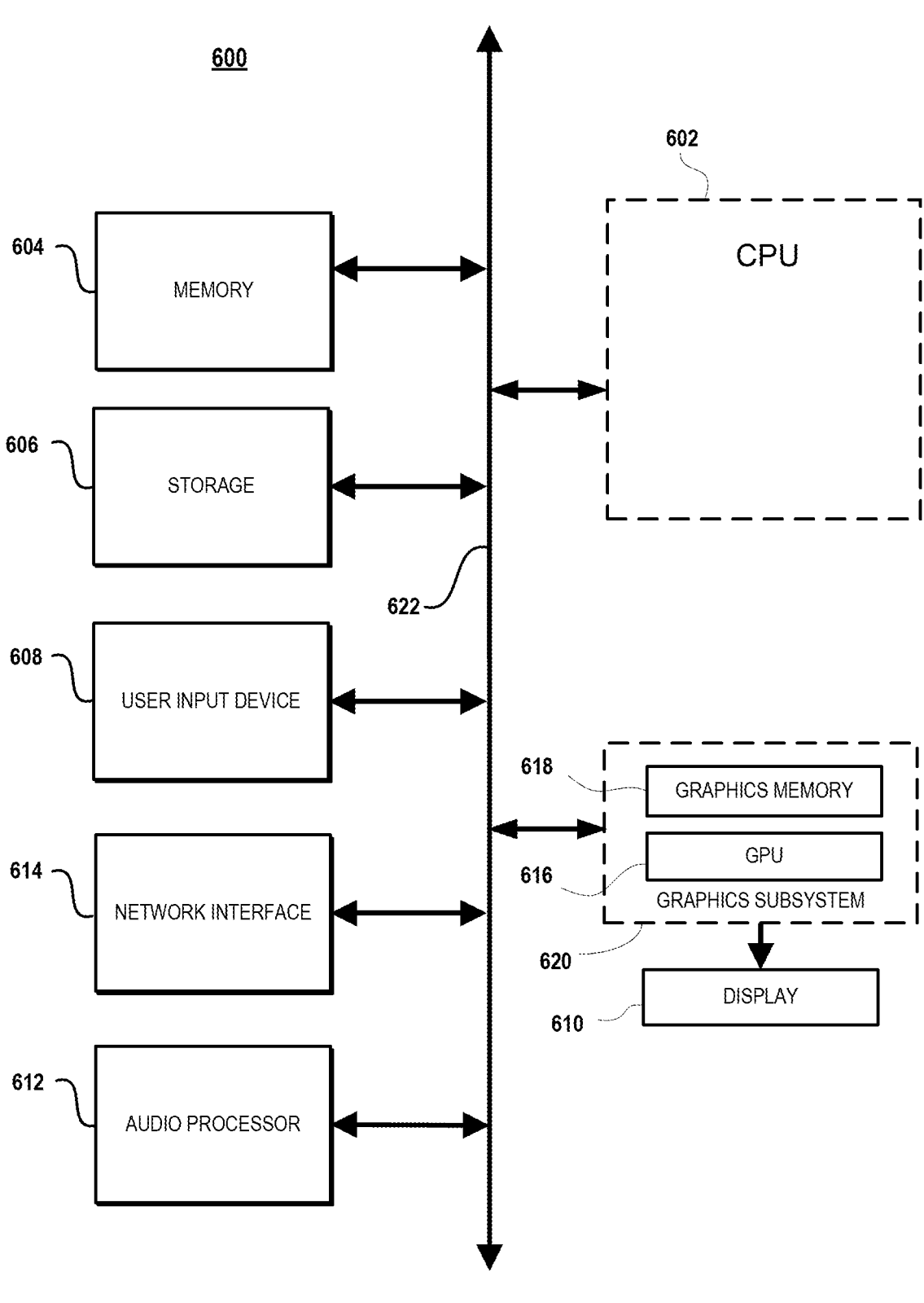
FIG. 6 illustrates components of an example device 600 that can be used to perform aspects of the various embodiments of the present disclosure.

FIG. 6 illustrates components of an example device 600 that can be used to perform aspects of the various embodiments of the present disclosure. This block diagram illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be a localized to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a nondistributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A computer-implemented method for generating a character for use in a video game, comprising:
   receiving captured video of a user;
   analyzing the captured video to identify movements of the user;
   using the identified movements of the user to define one or more animations of a character;
   receiving descriptive input generated by the user, wherein the descriptive input comprises a plurality of words that describe a desired appearance of the character;
   determining game-specific constraints for the character in the video game;
   generating a text prompt based on the descriptive input and the game-specific constraints, wherein the text prompt includes at least a subset of the plurality of words of the descriptive input;
   using the text prompt as an input to prompt a generative artificial intelligence (AI) to generate visual elements of the character; and
   using the character for gameplay of a video game, wherein using the character includes rendering the character having the generated visual elements and triggering the animations during the gameplay.

2. The computer-implemented method of claim 1, wherein receiving the descriptive input includes recording voice input of the user.

3. The computer-implemented method of claim 2, wherein using the descriptive input includes translating the recorded voice input into the plurality of words.

4. The computer-implemented method of claim 1, wherein the animations are configured to mimic the identified movements of the user.

5. The computer-implemented method of claim 1, wherein using the identified movements includes mapping the movements to a skeletal rig of the character.

6. The computer-implemented method of claim 1, wherein using the identified movements includes adjusting settings of one or more predefined animations for the character based on the identified movements.

7. The computer-implemented method of claim 1, further comprising, presenting an interface on a display, said interface configured to instruct the user to perform the movements.

8. The computer-implemented method of claim 1, wherein triggering the animations is responsive to receiving gameplay input generated from an input device.

9. The computer-implemented method of claim 1, wherein the visual elements include one or more of a texture, facial appearance, body structure, or clothing.

10. The computer-implemented method of claim 1, wherein the game-specific constraints include one or more of an art style, a character type, or a character function.

11. The computer-implemented method of claim 1, wherein the character defines an avatar of the user for the gameplay of the video game.

12. A non-transitory computer-readable medium having program instructions embodied thereon that, when executed by at least one computing device, cause said at least one computing device to implement a method for generating a character for use in a video game, said method including:
   receiving captured video of a user;
   analyzing the captured video to identify movements of the user;
   using the identified movements of the user to define one or more animations of a character;
   receiving descriptive input generated by the user, wherein the descriptive input comprises a plurality of words that describe a desired appearance of the character;
   determining game-specific constraints for the character in the video game;
   generating a text prompt based on the descriptive input and the game-specific constraints, wherein the text prompt includes at least a subset of the plurality of words of the descriptive input;
   using text prompt as an input to prompt a generative artificial intelligence (AI) to generate visual elements of the character; and
   using the character for gameplay of a video game, wherein using the character includes rendering the character having the generated visual elements and triggering the animations during the gameplay.

13. The non-transitory computer-readable medium of claim 12, wherein receiving the descriptive input includes recording voice input of the user.

14. The non-transitory computer-readable medium of claim 13, wherein using the descriptive input includes translating the recorded voice input into the plurality of words.

15. The non-transitory computer-readable medium of claim 12, wherein the animations are configured to mimic the identified movements of the user.

16. The non-transitory computer-readable medium of claim 12, wherein using the identified movements includes mapping the movements to a skeletal rig of the character.

17. The non-transitory computer-readable medium of claim 12, wherein using the identified movements includes adjusting settings of one or more predefined animations for the character based on the identified movements.

18. The non-transitory computer-readable medium of claim 12, further comprising, presenting an interface on a display, said interface configured to instruct the user to perform the movements.

\*  \*  \*  \*  \*